(12) United States Patent
Gould et al.

(10) Patent No.: US 9,418,095 B2
(45) Date of Patent: Aug. 16, 2016

(54) MANAGING CHANGES TO COLLECTIONS OF DATA

(75) Inventors: Joel Gould, Arlington, MA (US);
Timothy Perkins, Somerville, MA (US);
Adam Weiss, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 198 days.

(21) Appl. No.: 13/350,191

(22) Filed: Jan. 13, 2012

(65) Prior Publication Data

US 2012/0185449 A1 Jul. 19, 2012

Related U.S. Application Data

(60) Provisional application No. 61/433,082, filed on Jan. 14, 2011.

(51) Int. Cl.
*G06F 17/00* (2006.01)
*G06F 17/30* (2006.01)

(52) U.S. Cl.
CPC .................. *G06F 17/30371* (2013.01)

(58) Field of Classification Search
None
See application file for complete search history.

(56) References Cited

U.S. PATENT DOCUMENTS

| | | | |
|---|---|---|---|
| 5,758,351 A | 5/1998 | Gibson et al. | |
| 5,966,072 A | 10/1999 | Stanfill et al. | |
| 6,494,159 B2 | 12/2002 | Sirmalis et al. | |
| 6,708,186 B1 | 3/2004 | Claborn et al. | |
| 6,948,154 B1 | 9/2005 | Rothermel et al. | |
| 7,080,088 B1 | 7/2006 | Lau | |
| 7,110,924 B2 | 9/2006 | Prewett et al. | |
| 7,164,422 B1 | 1/2007 | Wholey, III et al. | |
| 7,167,850 B2 | 1/2007 | Stanfill | |
| 7,661,067 B2 | 2/2010 | Chen et al. | |
| 7,689,565 B1 * | 3/2010 | Gandhi | G06F 17/30575 707/999.01 |
| 7,716,630 B2 | 5/2010 | Wholey et al. | |
| 7,765,529 B1 | 7/2010 | Singh et al. | |
| 7,840,949 B2 | 11/2010 | Schumacher et al. | |
| 7,853,553 B2 | 12/2010 | Lankinen et al. | |

(Continued)

FOREIGN PATENT DOCUMENTS

| | | |
|---|---|---|
| EP | 2221733 | 8/2010 |
| JP | H11-143755 | 5/1999 |
| JP | 2006-277624 | 10/2006 |

OTHER PUBLICATIONS

Transaction History, U.S. Appl. No. 12/628,521.

(Continued)

*Primary Examiner* — Tony Mahmoudi
*Assistant Examiner* — Michael Le
(74) *Attorney, Agent, or Firm* — Occhiuti & Rohlicek LLP (57) ABSTRACT

Managing changes to a collection of records includes storing a first set of records in a data storage system, the first set of records representing a first version of the collection of records, and validating a proposed change to the collection of records specified by an input received over a user interface. The data storage system is queried based on validation criteria associated with the proposed change, and a first result is received in response to the querying. A second set of records is processed representing changes not yet applied to the collection of records to generate a second result. The first result is updated based on the second result to generate a third result. The third result is processed to determine whether the proposed change is valid according to the validation criteria.

68 Claims, 4 Drawing Sheets

(56) References Cited

U.S. PATENT DOCUMENTS

| | | | |
|---|---|---|---|
| 7,890,509 B1 | 2/2011 | Pearcy et al. | |
| 7,895,586 B2 | 2/2011 | Ozone | |
| 8,069,129 B2 | 11/2011 | Gould et al. | |
| 8,423,564 B1* | 4/2013 | Hayes | G06F 17/30345 707/611 |
| 8,484,159 B2 | 7/2013 | Stanfill et al. | |
| 8,516,008 B1 | 8/2013 | Marquardt | |
| 2001/0007959 A1 | 7/2001 | Abdalla | |
| 2001/0014890 A1 | 8/2001 | Liu et al. | |
| 2002/0161799 A1 | 10/2002 | Maguire et al. | |
| 2002/0194196 A1* | 12/2002 | Weinberg | G06F 17/30569 |
| 2003/0016246 A1 | 1/2003 | Singh | |
| 2003/0041063 A1* | 2/2003 | Brady | G06Q 10/00 |
| 2003/0154191 A1* | 8/2003 | Fish | G06F 8/34 |
| 2003/0163441 A1 | 8/2003 | Godfredsen | |
| 2003/0163597 A1 | 8/2003 | Hellman et al. | |
| 2004/0015783 A1 | 1/2004 | Lennon et al. | |
| 2004/0056908 A1 | 3/2004 | Bjornson et al. | |
| 2004/0225682 A1* | 11/2004 | Murman | G06Q 10/06 |
| 2004/0239681 A1 | 12/2004 | Robotham et al. | |
| 2005/0060313 A1 | 3/2005 | Naimat et al. | |
| 2005/0060317 A1 | 3/2005 | Lott et al. | |
| 2005/0114369 A1 | 5/2005 | Gould et al. | |
| 2005/0178833 A1 | 8/2005 | Kisliakov | |
| 2005/0187984 A1 | 8/2005 | Chen | |
| 2005/0234762 A1 | 10/2005 | Pinto et al. | |
| 2005/0262121 A1 | 11/2005 | Cesare et al. | |
| 2006/0020570 A1* | 1/2006 | Wu | 707/1 |
| 2006/0095466 A1 | 5/2006 | Stevens et al. | |
| 2006/0200739 A1 | 9/2006 | Bhatia et al. | |
| 2006/0282480 A1* | 12/2006 | Johnson | G06F 8/71 |
| 2007/0011208 A1 | 1/2007 | Smith | |
| 2007/0027858 A1 | 2/2007 | Weinberg et al. | |
| 2007/0050750 A1 | 3/2007 | Bykov et al. | |
| 2007/0094060 A1 | 4/2007 | Apps et al. | |
| 2007/0136692 A1 | 6/2007 | Seymour et al. | |
| 2007/0179956 A1* | 8/2007 | Whitmyer, Jr. | G06F 17/30371 |
| 2007/0198457 A1 | 8/2007 | Olenick et al. | |
| 2007/0226203 A1 | 9/2007 | Adya et al. | |
| 2007/0239751 A1 | 10/2007 | Wei et al. | |
| 2007/0271381 A1 | 11/2007 | Wholey et al. | |
| 2007/0276787 A1 | 11/2007 | Piedmonte | |
| 2007/0294119 A1 | 12/2007 | Eicher et al. | |
| 2008/0049022 A1 | 2/2008 | Sherb et al. | |
| 2008/0228697 A1 | 9/2008 | Adya et al. | |
| 2008/0243772 A1 | 10/2008 | Fuxman et al. | |
| 2008/0243891 A1 | 10/2008 | Super et al. | |
| 2008/0256014 A1 | 10/2008 | Gould et al. | |
| 2008/0312979 A1 | 12/2008 | Lee et al. | |
| 2008/0313204 A1 | 12/2008 | Schultz et al. | |
| 2009/0037488 A1* | 2/2009 | Abrams | G06F 17/30569 |
| 2009/0083313 A1 | 3/2009 | Stanfill et al. | |
| 2009/0094291 A1 | 4/2009 | Yalamanchi | |
| 2009/0319494 A1 | 12/2009 | Gooder | |
| 2009/0327196 A1 | 12/2009 | Studer et al. | |
| 2010/0100220 A1 | 4/2010 | Belanger et al. | |
| 2010/0114833 A1 | 5/2010 | Mu | |
| 2010/0121890 A1 | 5/2010 | Perkins et al. | |
| 2010/0138383 A1* | 6/2010 | Winters et al. | 707/609 |
| 2010/0138388 A1 | 6/2010 | Wakeling et al. | |
| 2010/0145914 A1 | 6/2010 | Kanno et al. | |
| 2010/0198769 A1 | 8/2010 | Gould et al. | |
| 2010/0223218 A1 | 9/2010 | Prendergast | |
| 2011/0061057 A1 | 3/2011 | Harris et al. | |
| 2011/0066602 A1 | 3/2011 | Studer et al. | |
| 2011/0295863 A1* | 12/2011 | Weir et al. | 707/754 |
| 2012/0054164 A1* | 3/2012 | Falkebo et al. | 707/704 |
| 2012/0102029 A1 | 4/2012 | Larson et al. | |
| 2012/0158625 A1 | 6/2012 | Nelke et al. | |
| 2012/0167112 A1 | 6/2012 | Harris et al. | |
| 2012/0185449 A1 | 7/2012 | Gould et al. | |
| 2013/0166515 A1 | 6/2013 | Kung | |
| 2014/0108357 A1 | 4/2014 | Procops | |

OTHER PUBLICATIONS

Transaction History, U.S. Appl. No. 12/883,721.
Transaction History, U.S. Appl. No. 13/281,039.
International Search Report & Written Opinion issued in PCT application No. PCT/US2011/057623, dated Jan. 25, 2012, 13 pages.
International Search Report & Written Opinion issued in PCT application No. PCT/US2012/021286, dated May 4, 2012, 15 pages.
Melia, Mark et al., "Constraint-Based Validation of Adaptive e-Learning Courseware," IEEE Transactions on Learning Technologies, vol. 2, No. 1, Jan.-Mar. 2009, pp. 37-49.
Rull, Guillem et al., "MVT: A Schema Mapping Validation Tool," EDBT'09, Mar. 24-26, 2009, pp. 1120-1123.
International Search Report & Written Opinion issued in PCT application No. PCT/US09/66210, mailed Jan. 27, 2010, 8 pages.
International Search Report & Written Opinion issued in PCT application No. PCT/US10/49142, dated Nov. 5, 2010, 11 pages.
Van Megen, Rudolf et al., "Costs and benefits of early defect detection: experiences from developing client server and host applications." Software Quality Journal 4, 247-256 (1995).
U.S. Appl. No. 12/628,521, filed May 7, 2014.
U.S. Appl. No. 12/883,721, filed May 7, 2014.
U.S. Appl. No. 13/281,039, filed May 7, 2014.
U.S. Appl. No. 13/653,995, filed May 7, 2014.
Chaiken et al., "Scope: easy and efficient parallel processing of massive data sets," J. Proc. of the VLDB Endowment VLDB Endowment Hompagearchive, vol. 1, No. 2, (2008), pp. 1265-1276.
Pinheiro et al., "Mobile agents for aggregation of network management data," Published in Agent Systems and Applications, (1999) and Third International Symposium on Mobile Agents, Proceedings, First International Symposium, 1999, pp. 130-140.
Japanese Office Action issued in JP2012-529903, dated Aug. 7, 2014, 4 pages (English Translation).
Japanese Office Action issued in JP2011-539631, dated Oct. 24, 2013, 3 pages (English Translation).
Harkins, Susan "Use Excel's Conditional Formatting to Find Errors" TechRepublic, pp. 1-3, Feb. 16, 2008: http://www.techrepublic.com/blog/microsoft-office/use-excels-conditional-formatting-to-find-errors/.
International Search Report & Written Opinion issued in PCT application No. PCT/US2013/064979, dated Nov. 28, 2013, 11 pages.
Liskin, Miriam "Microsoft Access 97 for Windows SuperGuide" Ziff-Davis Press, Jan. 1, 1997, ch. 4 & 15, pp. 117-157 and 687-739.

* cited by examiner

| | Source: AgreementLegalSt_MSA | Target: AgreementLegalSt_SAP | |
|---|---|---|---|
| | PurPoNumber —402  P002 ⊗ | LegalFlag  Filter... ⊗ | Comment |
| New | | | |
| 1 | P002 ◄  406 | N ◄  408 | } 404 |

FIG. 4A 418  400B  420

| | Source: AgreementLegalSt_MSA | Target: AgreementLegalSt_SAP | |
|---|---|---|---|
| 414 | PurPoNumber —402  P002 ⊗ | LegalFlag  Filter... ⊗ | Comment |
| ❶ New | P003 ◄ | X ◄ | } 410 |
| ❶ 1 | P003  412 | Y | } 409 |
| 2 | P002 | N  414 | |
| 416 | 407 | | |

FIG. 4B

MANAGING CHANGES TO COLLECTIONS OF DATA

CROSS-REFERENCE TO RELATED APPLICATIONS

This application claims priority to U.S. Application Ser. No. 61/433,082, filed on Jan. 14, 2011, incorporated herein by reference.

BACKGROUND

This description relates to managing changes to collections of data.

Computing systems, such as database systems, provide various mechanisms for managing changes in collections of data. In some cases, users propose and implement changes to data stored in databases. In general, databases include rules that define how the stored data can be altered.

SUMMARY

In one aspect, in general, a method for managing changes to a collection of records includes storing a first set of records in a data storage system, the first set of records representing a first version of the collection of records. The method further includes validating a proposed change to the collection of records specified by an input received over a user interface. The validating includes: querying the data storage system based on validation criteria associated with the proposed change and receiving a first result in response to the querying, processing a second set of records representing changes not yet applied to the collection of records to generate a second result, updating the first result based on the second result to generate a third result, and processing the third result to determine whether the proposed change is valid according to the validation criteria.

In another aspect, in general, a computer-readable storage medium stores a computer program for managing changes to a collection of records. The computer program includes instructions for causing a computing system to: store a first set of records in a data storage system, the first set of records representing a first version of the collection of records; and validate a proposed change to the collection of records specified by an input received over a user interface. The validating includes: querying the data storage system based on validation criteria associated with the proposed change and receiving a first result in response to the querying, processing a second set of records representing changes not yet applied to the collection of records to generate a second result, updating the first result based on the second result to generate a third result, and processing the third result to determine whether the proposed change is valid according to the validation criteria.

In another aspect, in general, a computing system for managing changes to a collection of records includes: a data storage system storing a first set of records, the first set of records representing a first version of the collection of records; and at least one processor configured to validate a proposed change to the collection of records specified by an input received over a user interface. The validating includes: querying the data storage system based on validation criteria associated with the proposed change and receiving a first result in response to the querying, processing a second set of records representing changes not yet applied to the collection of records to generate a second result, updating the first result based on the second result to generate a third result, and processing the third result to determine whether the proposed change is valid according to the validation criteria.

In another aspect, in general, a computing system for managing changes to a collection of records includes: means for storing a first set of records, the first set of records representing a first version of the collection of records; and means for validating a proposed change to the collection of records specified by an input received over a user interface. The validating includes: querying the data storage system based on validation criteria associated with the proposed change and receiving a first result in response to the querying, processing a second set of records representing changes not yet applied to the collection of records to generate a second result, updating the first result based on the second result to generate a third result, and processing the third result to determine whether the proposed change is valid according to the validation criteria.

Aspects can include one or more of the following features. The first set of records includes a metadata map that maps one or more source values to respective target values. The proposed change is invalidated if one of the one or more source values are mapped to two or more different target values. Processing the third result includes identifying whether applying the proposed change would result in a creation of one or more duplicate records. Identifying whether applying the proposed change would result in a creation of one or more duplicate records includes identifying one or more duplicate rows. The one or more duplicate rows are identified using one or more source values as the validation criteria. The second set of records includes one or more changesets that represent proposed changes to the first set of records that have been entered into a user interface. The input includes an instruction to apply changes associated with a previously-saved changeset to the first set of records. Validating the proposed change to the collection of records includes validating the proposed change against other proposed changes specified in the user interface by the input. The user interface includes one or more filters to selectively display one or more subsets of sets of records. A notification is generated if the proposed change is not validated. The notification identifies a portion of the proposed change that violates the validation criteria.

Aspects can include one or more of the following advantages. For example, the techniques described herein can be used to maintain the integrity and accuracy of various databases and files. The techniques described herein may also allow an administrator to efficiently maintain one or more record systems.

Other features and advantages of the invention will become apparent from the following description, and from the claims.

DESCRIPTION

Figure 1:
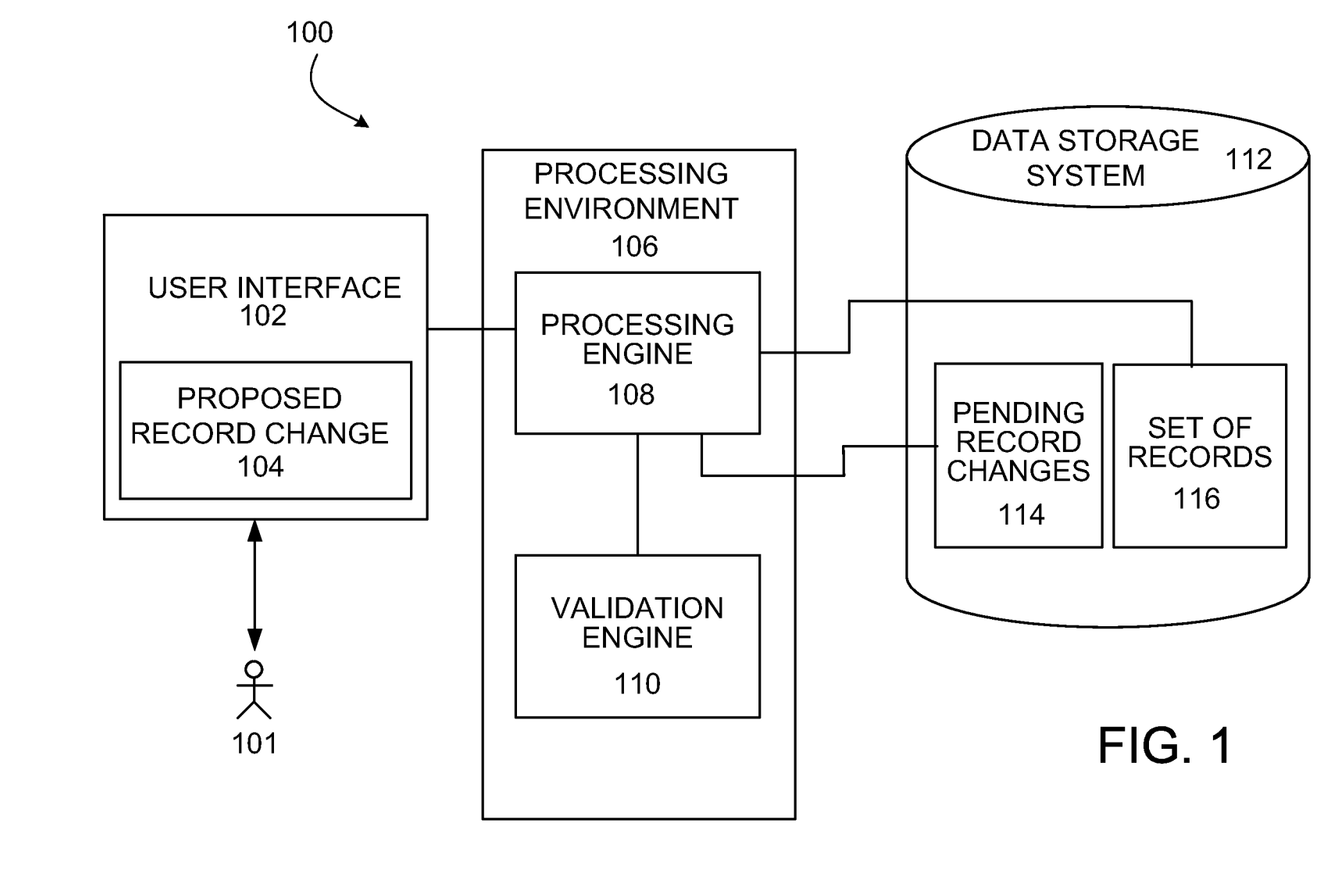
FIG. 1 is a block diagram of a system for executing graph-based computations.

FIG. 1 shows an exemplary computing environment 100 in which techniques for managing changes to collections of data (e.g., data structured as records) can be used. The system 100 includes a data storage system 112 that may include one or more sources of data such as storage devices or connections to online data streams, each of which may store data in any of a variety of storage formats (e.g., database tables, spreadsheet files, flat text files, or a native format used by a mainframe).

A processing environment 106 includes a processing engine 108 and a validation engine 110. The processing environment 106 may be hosted on one or more general-purpose computers under the control of a suitable operating system, such as the UNIX operating system. For example, the processing environment 106 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via a local area network (LAN) and/or wide-area network (WAN)), or any combination thereof.

Storage devices providing the data storage system 112 may be local to the processing environment 106, for example, being stored on a storage medium connected to a computer running the processing environment 106 (e.g., a hard drive), or may be remote to the processing environment 106, for example, being hosted on a remote system (e.g., a mainframe) in communication with a computer running the processing environment 106, over a remote connection.

The processing environment 106 (and/or its associated components, such as the processing engine 108) can receive data from a variety of types of systems including different forms of database systems. The data may be organized as records having values for respective fields (also called "attributes" or "columns"), including possibly null values. When first reading data from a data source, the processing environment 106 typically starts with some initial format information about records in that data source. In some circumstances, the record structure of the data source may not be known initially and may instead be determined after analysis of the data source. The initial information about records can include the number of bits that represent a distinct value, the order of fields within a record, and the type of value (e.g., string, signed/unsigned integer) represented by the bits.

The computing environment 100 also includes a user interface 102 configured to communicate commands from a user 101 to the processing environment 106. In some examples, and as described in further detail below, the user 101 can use the user interface 102 to input a proposed record change 104. For example, the user 101 may attempt to alter one or more records in a set of records 116 stored in the data storage system 112 by entering a proposed record change 104 that includes the addition and/or deletion of rows or columns from a table in the set of records 116, or changes to the values in one or more fields of a table. The user interface 102 can also communicate information from the processing environment 106 to the user 101 using a variety of output devices, such as computer displays, speakers, and the like. For example, the user interface 102 can include a graphical display that can graphically represent the information stored in the data storage system 112 (e.g., by displaying a grid that represents the columns and rows of a database table).

The processing engine 108 and the validation engine 110 use the proposed record change 104 and information retrieved from the data storage system 112 to validate and/or implement changes to the set of records 116 stored in the data storage system 112. The information retrieved from the data storage system 112 can include information related to one or more pending record changes 114 (e.g., changes to the set of records 116 that have not yet been implemented, but may have already been validated and/or saved). In some examples, the pending record changes are referred to as "changesets." In general, the processing engine 108 receives and processes record data, including data that represents instructions for altering one or more sets of records. The processing engine 108 may use data from the proposed records change 104, the pending records changes 114, and the set of records 116 to generate or execute instructions for changing the set of records 116 stored in the data storage system 112. In some examples, the validation engine 110 validates the instructions for changing the collection of records before the instructions are executed (e.g., by the processing engine 108) to alter the collection of records. While the processing environment 106 contains both the processing engine 108 and the validation engine 110, the processing environment 106 can divide its tasks among any number of individual task engines. For example, a single task engine could perform the functions of both the processing engine 108 and the validation engine 110. Similarly, the tasks performed by the processing engine 108 and the validation engine 110 could be divided among a plurality of sub task engines.

The data stored in the data storage system 112 is accessible to the processing environment 106. The data storage system 112 may also be directly or indirectly accessible to the user interface 102 in which a developer 101 is able to propose and implement changes to the data stored in the data storage system 112. In some examples, the user interface 102 is associated with a development environment for developing applications such as dataflow graphs that include vertices (representing components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference. A system for executing such graph-based computations is described in U.S. Pat. No. 5,566,072, EXECUTING COMPUTATIONS EXPRESSED AS GRAPHS, incorporated herein by reference. Dataflow graphs made in accordance with this system provide methods for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets, or use shared memory to pass data between the processes).

Figure 2:
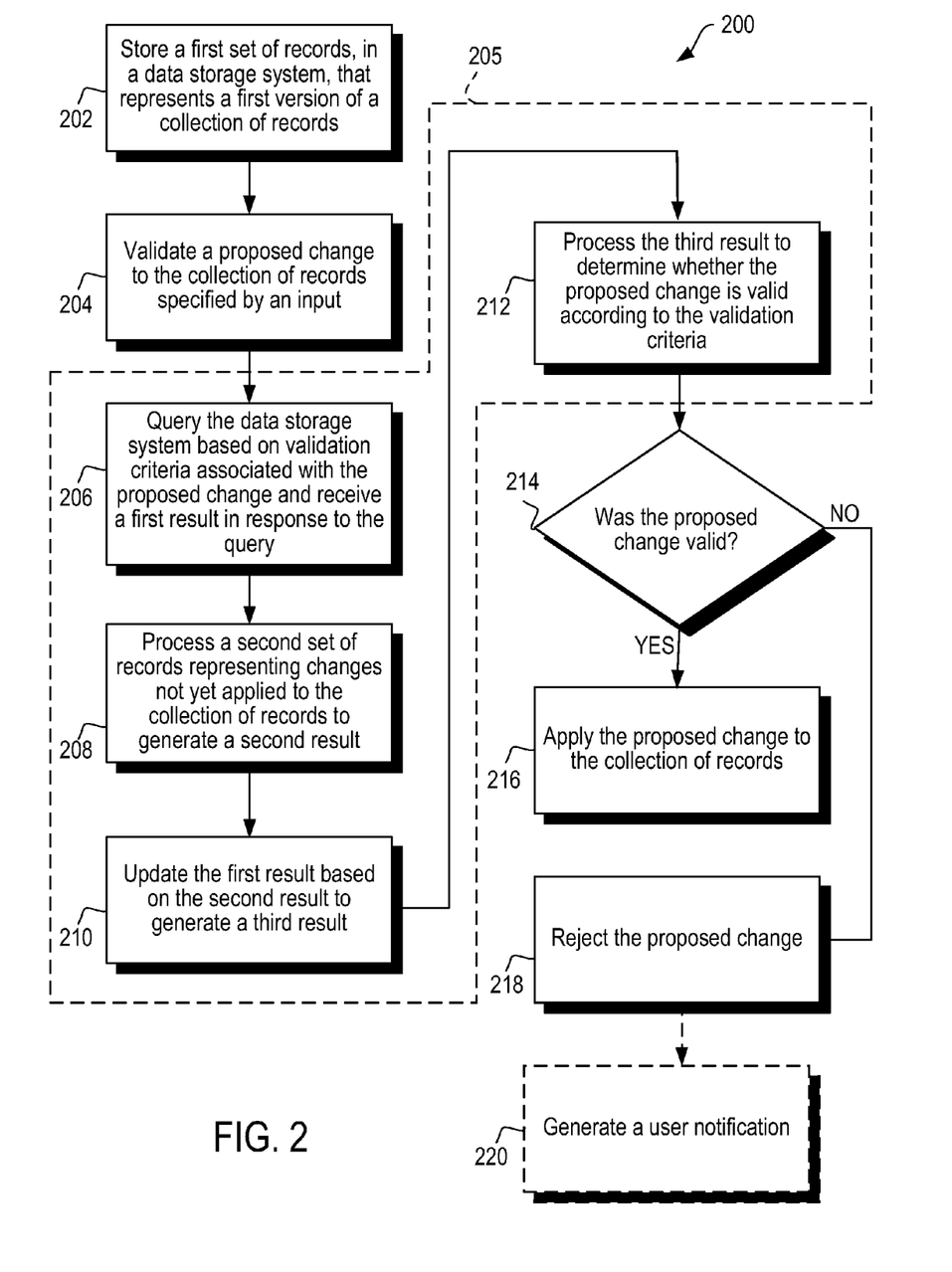
FIG. 2 is a flowchart of an exemplary procedure for managing changes to a collection of records.

FIG. 2 shows a flowchart for an exemplary procedure 200 for managing changes to record collections. The procedure 200 can be performed by one or more of the modules in the computing environment 100 (e.g., the processing engine 108).

A first set of records is stored (202) in a data storage system, the first set of records representing a first version of a collection of records. In some examples, the collection of records represents a collection of information that is to be accurately maintained and updated for use in processing data, such as metadata maps. In general, a metadata map can specify a translation of values between two different systems. For example, if a first system uses the values M (male) and F (female) to define a "gender" field, and a second system uses the values 0 (male) and 1 (female) to define the gender field, a metadata map can be used to translate values from the first ("source") system to the second ("target") system (e.g., M→0, F→1). Mappings can be made between single fields or between sets of fields (e.g., mapping multiple columns from a first system to a second system). For example, consider a first system that stores a record containing a first column representing a gender of a person and a second column representing a state in which the person lives. In this example, the gender code may depend on the states, where a first gender code mapping is used for one state and a second gender code mapping is used for another state. Records with the state MA may map the value 1 to Male, but records with the state NY may map the value 3 to male. In this example, the combination MA/0 maps to Male, the combination MA/1 maps to Female, and the combination NY/3 maps to male.

In some examples, metadata maps provide a translation from one (and only one) source value to a target value. In these examples, metadata maps cannot provide a translation for M→0 as well as F→0, as such a translation could cause an error. This manner of translation would essentially destroy the distinction between "M" and "F," as the two different source values would be mapped to the same target value. Accordingly, in many cases, each target value may only be associated with one source value. In other implementations, if it is not desirable for a target system to maintain a distinction between two differing source values (e.g., M and F), then multiple source values could be mapped to the same target value.

A proposed change to the collection of records specified by an input is validated (204). In some examples, validating (204) the proposed change includes a validation process 205 that includes the procedures 206, 208, 210, and 212. That is, in validating (204) the proposed change, the data storage system is queried based on validation criteria associated with the proposed change, and a first result is received in response to the query (206). For example, after receiving information about the proposed record change 104, the processing engine 108 queries the data storage system 112. In some examples, querying the data storage system 112 causes the data storage system 112 to return a first result that identifies rows and/or columns which are relevant to the rows and/or columns affected by the proposed changes 104. The validation criteria on which the query is based represent a set of values from source or target columns of a particular row. For example, source column validation criteria can be used to validate that implementing the proposed change 104 will not result in duplicate rows in the set of records 116, while values from target columns can be used to validate that a map between source and target values is reversible (e.g., to confirm that each set of target values is unique). The processing engine 108 may store the first result (e.g., in local memory) for later use in validating the proposed record change 104.

To generate a second result, a second set of records ("changesets") is processed that represents changes not yet applied to the collection of records (208). For example, the processing engine 108 can processes the pending record changes 114 stored in the data storage system 112 in order to generate a second result that represents changes that may conflict with the proposed record change 104. For example, if the proposed record change 104 contained an instruction to modify a value of row X the processing engine could extract any instructions from the pending record changes 114 that relate to row X. The information extracted from the pending record changes 114 is stored (e.g., in local memory) as the second result. In some implementations, the processing engine 108 can pass the first result to the validation engine 110 in order to validate the proposed record change 104 without considering the pending record changes 114. Similarly, the processing engine 108 can pass the second result to the validation engine 110 in order to validate the pending record changes 114 without considering the proposed record change 104. In some examples, changesets can be generated using one or more of the environments and techniques shown in FIGS. 4A, 4B (described in more detail below).

The first result is updated based on the second result to generate a third result (210). For example, after a generation of the first and second result in the manner discussed above, the processing engine 108 can update the first result with information from the second result to generate a third result. In some examples, the third result includes rows and/or columns identified in the first and second results. The third result can be processed to determine whether the proposed change is valid according to the validation criteria (212). For example, the processing engine 108 can pass the third result and the proposed record change 104 to the validation engine 110. The validation engine 110 can then compare the proposed record change 104 (e.g., using the validation criteria identified in the proposed record change 104) to determine whether the proposed record change 104 is valid (214). Determining whether the proposed changes to the set of records is valid may include one or more of checking for duplicate source values, verifying that each set of source values maps to a unique set of target values, and verifying that any ranges (e.g., date ranges) do not overlap.

If the proposed change was determined to be invalid (NO), the proposed change is rejected (218). One or more user notifications can also be generated (220). In some examples, the notifications can identify one or more reasons why the proposed change was invalidated. For example, if the validation engine 110 rejects a proposed change because the proposed change includes instructions to modify a row that has been deleted in the pending record change 114, a notification can be generated on the user interface 102 that identifies the conflict between the proposed record change 104 and the pending record changes 114.

If the proposed change is determined to be valid (YES), the proposed change can be applied to the collection of records. For example, if the validation engine 110 determines that the proposed change 104 are valid according to the validation criteria, the processing engine 106 (or another suitable entity) can modify the set of records 116 according to the instructions provided in the proposed record change 104. For example, if the proposed record change 104 contains an instruction to modify a row in the set of records 116, and the validation engine 110 determines that the proposed record change 104 is valid according to the validation criteria, the processing engine 108 may modify a row in the set of records 116 identified in the proposed record change 104.

In some examples, the validation process querying rows from an external table based on a validation critieria, which may be either a set of source values or a set of target values. A data storage system (e.g., a metadata storage repository) may then be queried for saved rows on a current changeset that represent an update or a deletion of an external row. In some examples, this query of the data storage system might not use the validation criteria, because the nature of the override may mean that the resulting row no longer matches the validation criteria. External rows may be removed that no longer match the validation criteria based on the saved overrides from the data storage system. The data storage system may then be queried for rows that match the validation criteria. Some or all of the resulting rows that match the unique identifier of an external row that is already in the validation set may replace the corresponding external row. Other rows that match the validation criteria may then be added to the set. Finally any unsaved changes from a user interface may replace or remove existing rows with the same unique identifier from the validation set based on whether the latest change matches the validation criteria. Unsaved rows that match the validation criteria and represent new rows (e.g., inserts for the external table) may be added to the validation set. The final set of rows can then be used to apply the validation.

Figure 3:
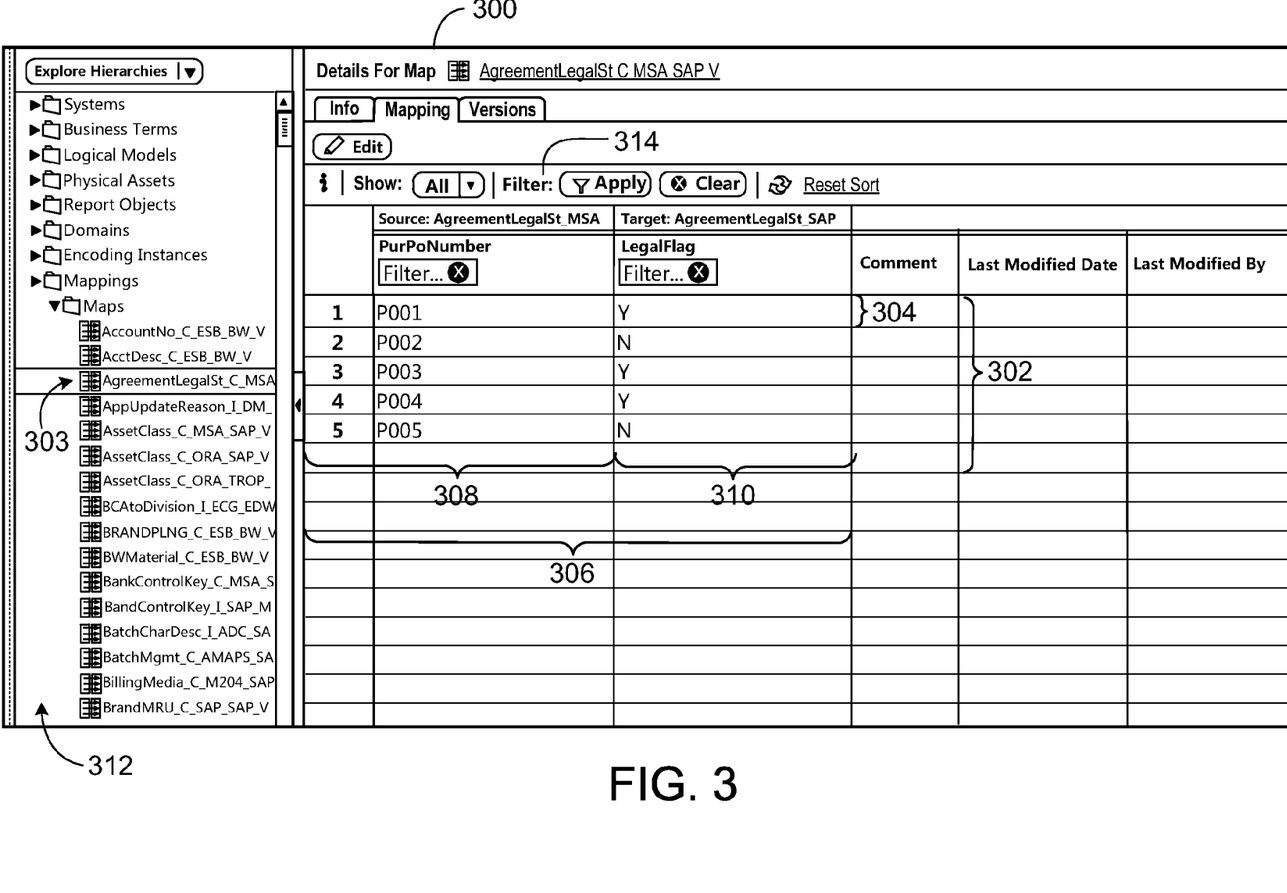
FIG. 3 is a screenshot of an exemplary computing environment.

FIG. 3 is an exemplary screenshot of an environment 300 that could be displayed, for example, on the user interface 102. Users (e.g., user 101) may use the environment 300 to view and interact with one or more records. The environment 300 provides a file explorer 312, which displays an arrangement of files using one or more organization systems. In this example, the files are organized into hierarchies (e.g., the parent "mappings" contains a child node "Maps," which in turn contains a number of sub-child node files. Users can navigate the file explorer to select and display one or more files, such as the selected file 303.

After a file has been selected, one or more filters 314 can be applied to the data associated with the selected file 303. The application of the filters 314 can alter the type or amount of data that will be displayed in the environment 300. For example, a filter 314 could be applied to the selected file 303 to suppress the display of rows for which target values have not been entered.

In this example, the selected file 303 is a metadata map. As discussed above, in general, a metadata map can be a translation of values between two different systems. In FIG. 3, the metadata map includes five rows 302, including a first row 304. The metadata map also includes two columns 306, including a first column 308 and a second column 310. Referring to the first row 304, the first column 308 represents a source value (P001) for a piece of metadata. The second column 310 represents a target value (Y) for the same piece of metadata. Thus, in this example, the first column 308 and the second column 310 define a metadata map for the first row 304 of the selected file 303, mapping the source value P001 to a target value of "Y."

Figure 4A:
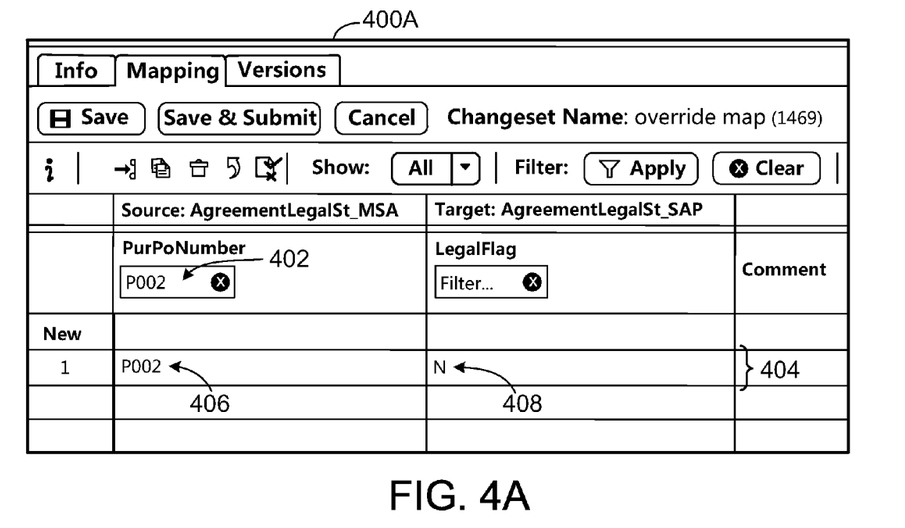
FIGS. 4A and 4B are screenshots of exemplary computing environments.
Figure 4B:
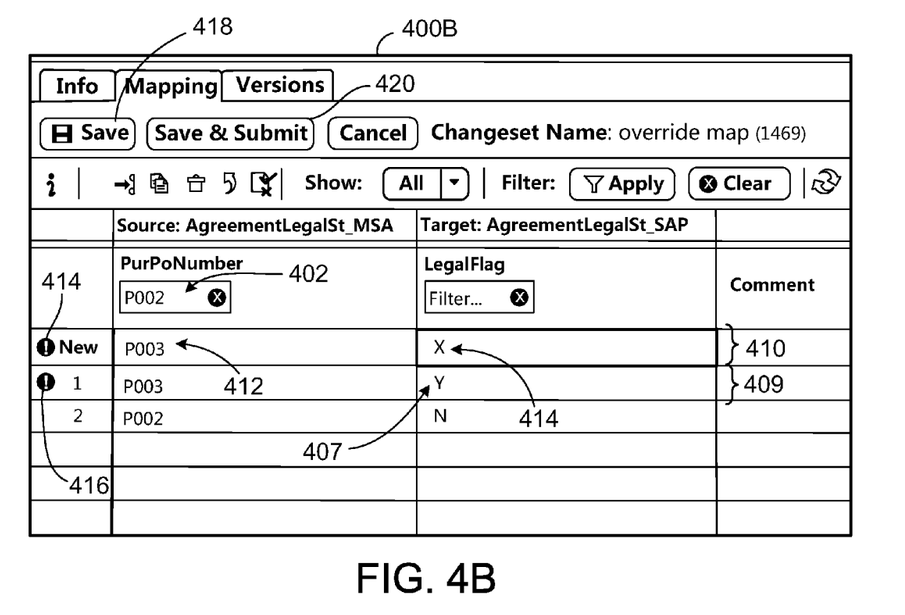

FIGS. 4A and 4B are exemplary environments 400A, 400B that demonstrate a technique in which rows associated with invalid proposed changes are automatically provided in a viewing environment so that a user can see a visual representation of a rule violation. FIG. 4A is an exemplary screenshot of an environment 400A that is similar to the environment 300 (FIG. 3) described above. The environment 400A displays metadata associated with a selected file, and includes a first row 404. In this example, a filter 402 causes the environment 400A to display only rows in which the source value has a value of "P002," which includes the first row 404. A first column of the first row 404 includes a source value 406 P002, which is mapped to a target value 408 "N" in a second column of the first row 404. Accordingly, the first row 404 represents a metadata map for the source value 406 P002.

FIG. 4B shows an environment 400B in which a user (or other entity) has added a second row 410 that represents an invalid change. As described above, an invalid change can result in a notification being generated to inform a user of a rule violation (e.g., a violation of validation criteria), even despite the existence of a filter that would normally suppress rows of a type represented by the notification. For example, as in FIG. 4A, the filter 402 remains in effect, which might typically limit the displayed rows to rows in which the source value has a value of P002. However, in this example, a second row 410 has been added (e.g., as a proposed change 104), which proposes mapping a source value 412 "P003" to a target value 414 "X." Upon analyzing the proposed change, the proposed change is invalidated with respect to either or both of a first result (e.g., a first result associated with the set of records 116) and a second result (e.g., a second result associated with the pending record changes 114). In this example, because the validation criteria specifies that a single source value cannot be mapped to more than one target value, the proposed mapping of the source value 412 P003 to the target value X 414 is invalid because it conflicts with a pre-existing mapping of the source value 412 P003 to a target value 407 "Y," represented by conflicting row 409.

The validation process can be triggered using a variety of techniques. For example, a user may activate a "validate change" control that instructs the validation engine 110 (FIG. 1) to validate proposed changes to the collection of records. The validation process can also be triggered after the change is entered into the user interface (e.g., the environment 400A, 400B). In some examples, the validation process can occur in real time, and can validate changes to the collection of records as a user enters (e.g., types) the changes into the user interface. Thus, the validation process may validate proposed changes against a stored (e.g., externally stored) collection of records, a stored set of pending record changes (e.g., changesets), and changes that appear in a user interface but have not yet been saved as changesets or applied to the collection of records (e.g., a first change in the user interface can be validated against other changes in the user interface that have not yet been implemented or saved as changesets).

After the proposed change is invalidated, the conflicting row 409 can be rendered in the environment 400B, even despite the application of the filter 402 which would otherwise suppress rows having a source value other than P002. In this case, the conflicting row 409 is rendered adjacent to the offending row (row 410) that represents the invalid proposed change. In addition, one or more notifications 414, 416 can be generated to draw a user's attention to the invalid proposed change. In order to correct the invalid proposed change, the user can either delete the proposed change, or can modify the proposed change and/or any conflicting values in order to satisfy the validation rule(s) that were violated.

The environment 400B also includes a save control 418 and a save and submit control 420 that can be activated by a user. In some examples, activation of the save control 418 will save any proposed changes entered by the user, but will not apply the proposed changes to the set of records (e.g., the data associated with the set of records will not be altered in response to activating the save control 418). Instead, activation of the save control 418 can cause the generation of a file (e.g., a changeset) that contains a saved proposed change that has not yet been applied to the set of records (e.g., the pending records changes 114 shown in FIG. 1). The save and submit control 420 can be activated by a user in order to both save the proposed changes and apply them to the set of records. Thus, if the proposed changes are determined to be valid (e.g., by the process 200 described with regard to FIG. 2), the set of records will be altered according to the proposed changes. In some examples, users can access a changeset in order to further edit the changeset or to implement the changes represented by the changeset. The implementation of a changeset to the collection of records can be subject to a validation process similar to the process 200 (FIG. 2). When implementing a changeset (e.g., applying the proposed changes in the changeset to a collection of records), the changeset may represent the proposed change 104, and the pending record changes 114 may be one or more changesets that are different from the changeset that is being validated.

The techniques for managing changes to record collections described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for managing a change to a collection of records, the method including:
   maintaining the collection of records and a pending change to the collection of records in a data storage system, wherein at least some of the records each include a metadata map that maps one or more source values to one or more target values, and the pending change having been previously proposed and validated but not yet applied to the collection of records; and
   validating a proposed change to the collection of records specified by an input received over a user interface, the validating including:
      querying the data storage system based on one or more validation criteria associated with the proposed change;
      receiving a first result in response to the querying indicating any records in the collection of records that include information that would be affected by the proposed change;
      processing the pending change, the pending change being different from the proposed change;
      determining a second result based on the processing indicating whether or not there are any conflicting records in the pending change that represent a potential conflict with the proposed change;
      generating a third result based on the first result and the second result indicating any records in the collection of records or in the conflicting records that include information that would be affected by the proposed change; and
      processing the third result to determine whether the proposed change is valid according to the one or more validation criteria.

2. The method of claim 1, wherein processing the third result includes invalidating the proposed change if the same set of one or more source values is mapped by two or more different metadata maps to two or more different sets of one or more target values, or two or more different sets of one or more source values are mapped by two or more different metadata maps to the same set of one or more target values.

3. The method of claim 1, wherein processing the third result includes identifying whether applying the proposed change would result in a creation of one or more duplicate records.

4. The method of claim 3, wherein identifying whether applying the proposed change would result in a creation of one or more duplicate records includes identifying one or more duplicate rows.

5. The method of claim 3, wherein the one or more duplicate rows are identified using one or more source values as the one or more validation criteria.

6. The method of claim 1, wherein the pending change includes one or more changesets that represent proposed changes to the collection of records that have been entered into the user interface.

7. The method of claim 1, wherein the input includes an instruction to apply changes associated with a previously-saved changeset to the collection of records.

8. The method of claim 1, wherein validating the proposed change to the collection of records includes validating the proposed change against other proposed changes specified in the user interface by the input.

9. The method of claim 1, wherein the user interface includes one or more filters to selectively display one or more subsets of sets of records.

10. The method of claim 1, further including generating a notification if the proposed change is not validated.

11. The method of claim 10, wherein the notification identifies a portion of the proposed change that violates the one or more validation criteria.

12. The method of claim 1, wherein the pending change is stored in the data storage system prior to receiving the input specifying the proposed change to the collection of records.

13. The method of claim 1, wherein querying the data storage system includes identifying one or more portions of the metadata map that are relevant to the proposed change.

14. The method of claim 13, wherein a portion of the metadata map is relevant to the proposed change when a source value or a target value in the portion of the metadata map matches a source value or a target value identified in the proposed change.

15. The method of claim 1, wherein the pending change includes a metadata map that maps one or more source values to one or more target values, and processing the pending change includes identifying one or more portions of the metadata map that are relevant to the proposed change.

16. The method of claim 15, wherein a portion of the metadata map is relevant to the proposed change when a source value or a target value in the portion of the metadata map matches a source value or a target value identified in the proposed change.

17. The method of claim 1, wherein the proposed change includes a metadata map that maps one or more source values to one or more target values.

18. A non-transitory computer-readable storage medium storing a computer program for managing a change to a collection of records, the computer program including instructions for causing a computing system to:
   maintain the collection of records and a pending change to the collection of records in a data storage system, wherein at least some of the records each include a metadata map that maps one or more source values to one or more target values, and the pending change having been previously proposed and validated but not yet applied to the collection of records; and
   validate a proposed change to the collection of records specified by an input received over a user interface, the validating including:
      querying the data storage system based on one or more validation criteria associated with the proposed change;
      receiving a first result in response to the querying indicating any records in the collection of records that include information that would be affected by the proposed change;
      processing the pending change, the pending change being different from the proposed change;
      determining a second result based on the processing indicating whether or not there are any conflicting records in the pending change that represent a potential conflict with the proposed change;
      generating a third result based on the first result and the second result indicating any records in the collection of records or in the conflicting records that include information that would be affected by the proposed change; and
      processing the third result to determine whether the proposed change is valid according to the one or more validation criteria.

19. The non-transitory computer-readable storage medium of claim 18, wherein processing the third result includes invalidating the proposed change if the same set of one or more source values is mapped by two or more different metadata maps to two or more different sets of one or more target values, or two or more different sets of one or more source values are mapped by two or more different metadata maps to the same set of one or more target values.

20. The non-transitory computer-readable storage medium of claim 18, wherein processing the third result includes identifying whether applying the proposed change would result in a creation of one or more duplicate records.

21. The non-transitory computer-readable storage medium of claim 20, wherein identifying whether applying the proposed change would result in a creation of one or more duplicate records includes identifying one or more duplicate TOWS.

22. The non-transitory computer-readable storage medium of claim 20, wherein the one or more duplicate rows are identified using one or more source values as the one or more validation criteria.

23. The non-transitory computer-readable storage medium of claim 18, wherein the pending change includes one or more changesets that represent proposed changes to the collection of records that have been entered into the user interface.

24. The non-transitory computer-readable storage medium of claim 18, wherein the input includes an instruction to apply changes associated with a previously-saved changeset to the collection of records.

25. The non-transitory computer-readable storage medium of claim 18, wherein validating the proposed change to the collection of records includes validating the proposed change against other proposed changes specified in the user interface by the input.

26. The non-transitory computer-readable storage medium of claim 18, wherein the user interface includes one or more filters to selectively display one or more subsets of sets of records.

27. The non-transitory computer-readable storage medium of claim 18, the computer program further including instructions for causing the computer system to generate a notification if the proposed change is not validated.

28. The non-transitory computer-readable storage medium of claim 27, wherein the notification identifies a portion of the proposed change that violates the one or more validation criteria.

29. The non-transitory computer-readable storage medium of claim 18, wherein the pending change is stored in the data storage system prior to receiving the input specifying the proposed change to the collection of records.

30. The non-transitory computer-readable storage medium of claim 18, wherein querying the data storage system includes identifying one or more portions of the metadata map that are relevant to the proposed change.

31. The non-transitory computer-readable storage medium of claim 30, wherein a portion of the metadata map is relevant to the proposed change when a source value or a target value in the portion of the metadata map matches a source value or a target value identified in the proposed change.

32. The non-transitory computer-readable storage medium of claim 18, wherein the pending change includes a metadata map that maps one or more source values to one or more target values, and processing the pending change includes identifying one or more portions of the metadata map that are relevant to the proposed change.

33. The non-transitory computer-readable storage medium of claim 32, wherein a portion of the metadata map is relevant to the proposed change when a source value or a target value in the portion of the metadata map matches a source value or a target value identified in the proposed change.

34. The non-transitory computer-readable storage medium of claim 18, wherein the proposed change includes a metadata map that maps one or more source values to one or more target values.

35. A computing system for managing a change to a collection of records, the computing system including:
   a data storage system comprising one or more data storage devices for maintaining the collection of records and a pending change to the collection of records, wherein at least some of the records each include a metadata map that maps one or more source values to one or more target values, and the pending change having been previously proposed and validated but not yet applied to the collection of records; and
   at least one hardware processor configured to validate a proposed change to the collection of records specified by an input received over a user interface, the validating including:
      querying the data storage system based on one or more validation criteria associated with the proposed change;

receiving a first result in response to the querying indicating any records in the collection of records that include information that would be affected by the proposed change;

processing the pending change, the pending change being different from the proposed change;

determining a second result based on the processing indicating whether or not there are any conflicting records in the pending change that represent a potential conflict with the proposed change;

generating a third result based on the first result and the second result indicating any records in the collection of records or in the conflicting records that include information that would be affected by the proposed change; and processing the third result to determine whether the proposed change is valid according to the one or more validation criteria.

36. The computing system of claim 35, wherein processing the third result includes invalidating the proposed change if the same set of one or more source values is mapped by two or more different metadata maps to two or more different sets of one or more target values, or two or more different sets of one or more source values are mapped by two or more different metadata maps to the same set of one or more target values.

37. The computing system of claim 35, wherein processing the third result includes identifying whether applying the proposed change would result in a creation of one or more duplicate records.

38. The computing system of claim 37, wherein identifying whether applying the proposed change would result in a creation of one or more duplicate records includes identifying one or more duplicate rows.

39. The computing system of claim 37, wherein the one or more duplicate rows are identified using one or more source values as the one or more validation criteria.

40. The computing system of claim 35, wherein the pending change includes one or more changesets that represent proposed changes to the collection of records that have been entered into the user interface.

41. The computing system of claim 35, wherein the input includes an instruction to apply changes associated with a previously-saved changeset to the collection of records.

42. The computing system of claim 35, wherein validating the proposed change to the collection of records includes validating the proposed change against other proposed changes specified in the user interface by the input.

43. The computing system of claim 35, wherein the user interface includes one or more filters to selectively display one or more subsets of sets of records.

44. The computing system of claim 35, wherein the processing unit is further configured to generate a notification if the proposed change is not validated.

45. The computing system of claim 44, wherein the notification identifies a portion of the proposed change that violates the one or more validation criteria.

46. The computing system of claim 35, wherein the pending change is stored in the data storage system prior to receiving the input specifying the proposed change to the collection of records.

47. The computing system of claim 35, wherein querying the data storage system includes identifying one or more portions of the metadata map that are relevant to the proposed change.

48. The computing system of claim 47, wherein a portion of the metadata map is relevant to the proposed change when a source value or a target value in the portion of the metadata map matches a source value or a target value identified in the proposed change.

49. The computing system of claim 35, wherein the pending change includes a metadata map that maps one or more source values to one or more target values, and processing the pending change includes identifying one or more portions of the metadata map that are relevant to the proposed change.

50. The computing system of claim 49, wherein a portion of the metadata map is relevant to the proposed change when a source value or a target value in the portion of the metadata map matches a source value or a target value identified in the proposed change.

51. The computing system of claim 35, wherein the proposed change includes a metadata map that maps one or more source values to one or more target values.

52. A computing system for managing a change to a collection of records, the computing system including:

means for maintaining the collection of records and a pending change to the collection of records in a data storage system, wherein at least some of the records each include a metadata map that maps one or more source values to one or more target values, and the pending change having been previously proposed and validated but not yet applied to the collection of records; and means for validating a proposed change to the collection of records specified by an input received over a user interface, the validating including:

querying the data storage system based on one or more validation criteria associated with the proposed change;

receiving a first result in response to the querying indicating any records in the collection of records that include information that would be affected by the proposed change;

processing the pending change, the pending change being different from the proposed change;

determining a second result based on the processing indicating whether or not there are any conflicting records in the pending change that represent a potential conflict with the proposed change;

generating a third result based on the first result and the second result indicating any records in the collection of records or in the conflicting records that include information that would be affected by the proposed change; and processing the third result to determine whether the proposed change is valid according to the one or more validation criteria.

53. The computing system of claim 52, wherein processing the third result includes invalidating the proposed change if the same set of one or more source values is mapped by two or more different metadata maps to two or more different sets of one or more target values, or two or more different sets of one or more source values are mapped by two or more different metadata maps to the same set of one or more target values.

54. The computing system of claim 52, wherein processing the third result includes identifying whether applying the proposed change would result in a creation of one or more duplicate records.

55. The computing system of claim 54, wherein identifying whether applying the proposed change would result in a creation of one or more duplicate records includes identifying one or more duplicate rows.

56. The computing system of claim 54, wherein the one or more duplicate rows are identified using one or more source values as the one or more validation criteria.

57. The computing system of claim 52, wherein the pending change includes one or more changesets that represent proposed changes to the collection of records that have been entered into the user interface.

58. The computing system of claim 52, wherein the input includes an instruction to apply changes associated with a previously-saved changeset to the collection of records.

59. The computing system of claim 52, wherein validating the proposed change to the collection of records includes validating the proposed change against other proposed changes specified in the user interface by the input.

60. The computing system of claim 52, wherein the user interface includes one or more filters to selectively display one or more subsets of sets of records.

61. The computing system of claim 52, further including means for generating a notification if the proposed change is not validated.

62. The computing system of claim 61, wherein the notification identifies a portion of the proposed change that violates the one or more validation criteria.

63. The computing system of claim 52, wherein the pending change is stored in the data storage system prior to receiving the input specifying the proposed change to the collection of records.

64. The computing system of claim 52, wherein querying the data storage system includes identifying one or more portions of the metadata map that are relevant to the proposed change.

65. The computing system of claim 64, wherein a portion of the metadata map is relevant to the proposed change when a source value or a target value in the portion of the metadata map matches a source value or a target value identified in the proposed change.

66. The computing system of claim 52, wherein the pending change includes a metadata map that maps one or more source values to one or more target values, and processing the pending change includes identifying one or more portions of the metadata map that are relevant to the proposed change.

67. The computing system of claim 66, wherein a portion of the metadata map is relevant to the proposed change when a source value or a target value in the portion of the metadata map matches a source value or a target value identified in the proposed change.

68. The computing system of claim 52, wherein the proposed change includes a metadata map that maps one or more source values to one or more target values.

* * * * *